US006831436B2

(12) United States Patent
Gonzalez

(10) Patent No.: US 6,831,436 B2
(45) Date of Patent: Dec. 14, 2004

(54) MODULAR HYBRID MULTI-AXIS ROBOT

(76) Inventor: Jose Raul Gonzalez, 250 Oak Dr., Ormond Beach, FL (US) 32176

( * ) Notice: Subject to any disclaimer, the term of this patent is extended or adjusted under 35 U.S.C. 154(b) by 246 days.

(21) Appl. No.: 10/128,161

(22) Filed: Apr. 22, 2002

(65) Prior Publication Data
US 2003/0197481 A1 Oct. 23, 2003

(51) Int. Cl.[7] .............................................. G05B 19/19
(52) U.S. Cl. ............................. 318/568.11; 318/568.12; 318/568.21; 318/567
(58) Field of Search ....................... 318/568.11, 568.12, 318/568.21, 567

(56) References Cited

U.S. PATENT DOCUMENTS

| | | | |
|---|---|---|---|
| 4,089,427 A | | 5/1978 | Pardo et al. .............. 214/1 CM |
| 4,187,051 A | * | 2/1980 | Kirsch et al. ............ 414/744.3 |
| 4,607,651 A | * | 8/1986 | Noh et al. .................... 134/62 |
| 4,766,775 A | | 8/1988 | Hodge ......................... 74/479 |
| 5,100,286 A | | 3/1992 | Anderson ................... 414/749 |
| 5,241,875 A | | 9/1993 | Kochanneck ........... 74/479 BP |
| 5,523,662 A | | 6/1996 | Goldenberg et al. ... 318/568.11 |
| 5,581,166 A | * | 12/1996 | Eismann et al. ........ 318/568.22 |
| 5,974,681 A | | 11/1999 | Gonzalez-Martin et al. ... 34/58 |
| 6,029,369 A | | 2/2000 | Gonzalez-Martin et al. .. 34/317 |
| 6,213,853 B1 | | 4/2001 | Gonzalez-Martin et al. 451/287 |
| 6,227,946 B1 | | 5/2001 | Gonzalez-Martin et al. .. 451/54 |
| 6,235,172 B1 | * | 5/2001 | Begin et al. ........... 204/298.27 |
| 6,242,879 B1 | * | 6/2001 | Sagues et al. .............. 318/567 |
| 6,279,413 B1 | * | 8/2001 | Terada et al. ............ 74/490.02 |
| 6,309,279 B1 | * | 10/2001 | Bowman et al. .............. 451/41 |

OTHER PUBLICATIONS

Website page, Robotics On Line, Bennett Brumson, "Scara vs. Cartesian Robots: Selecting the Right Type for Your Applications", 3 pages.

* cited by examiner

Primary Examiner—Rita Leykin
(74) Attorney, Agent, or Firm—Thomas Schneck

(57) ABSTRACT

A modular multi-axis robot that can be configured to operate with two, three, four, five or six axes of movement and in various combinations of rotational and translational motion. The modules that make up the robot are fully detachable, interchangeable and are functionally independent with respect to each other. This allows the robotic apparatus to provide a flexible and custom solution for many different applications.

38 Claims, 15 Drawing Sheets

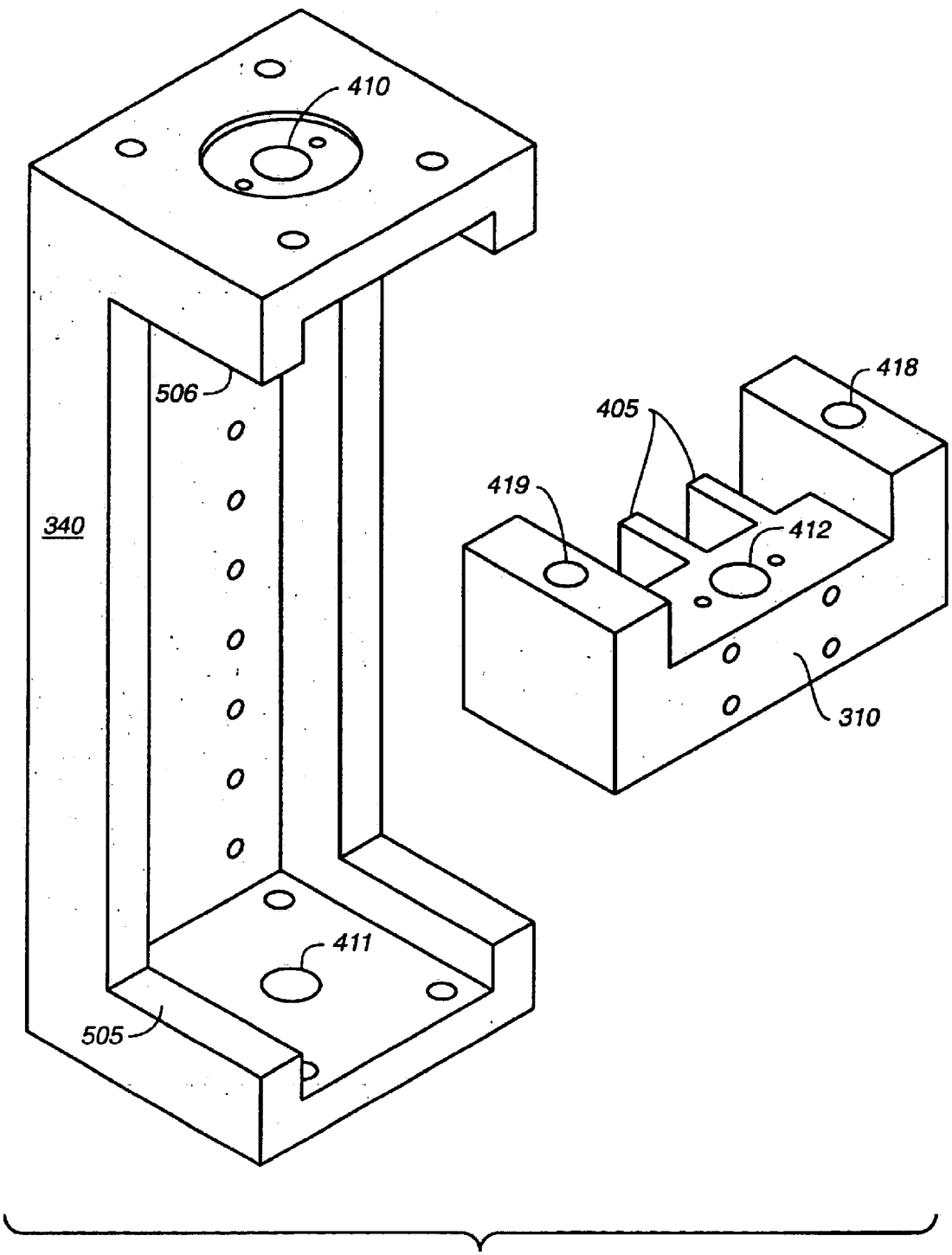
FIG._10

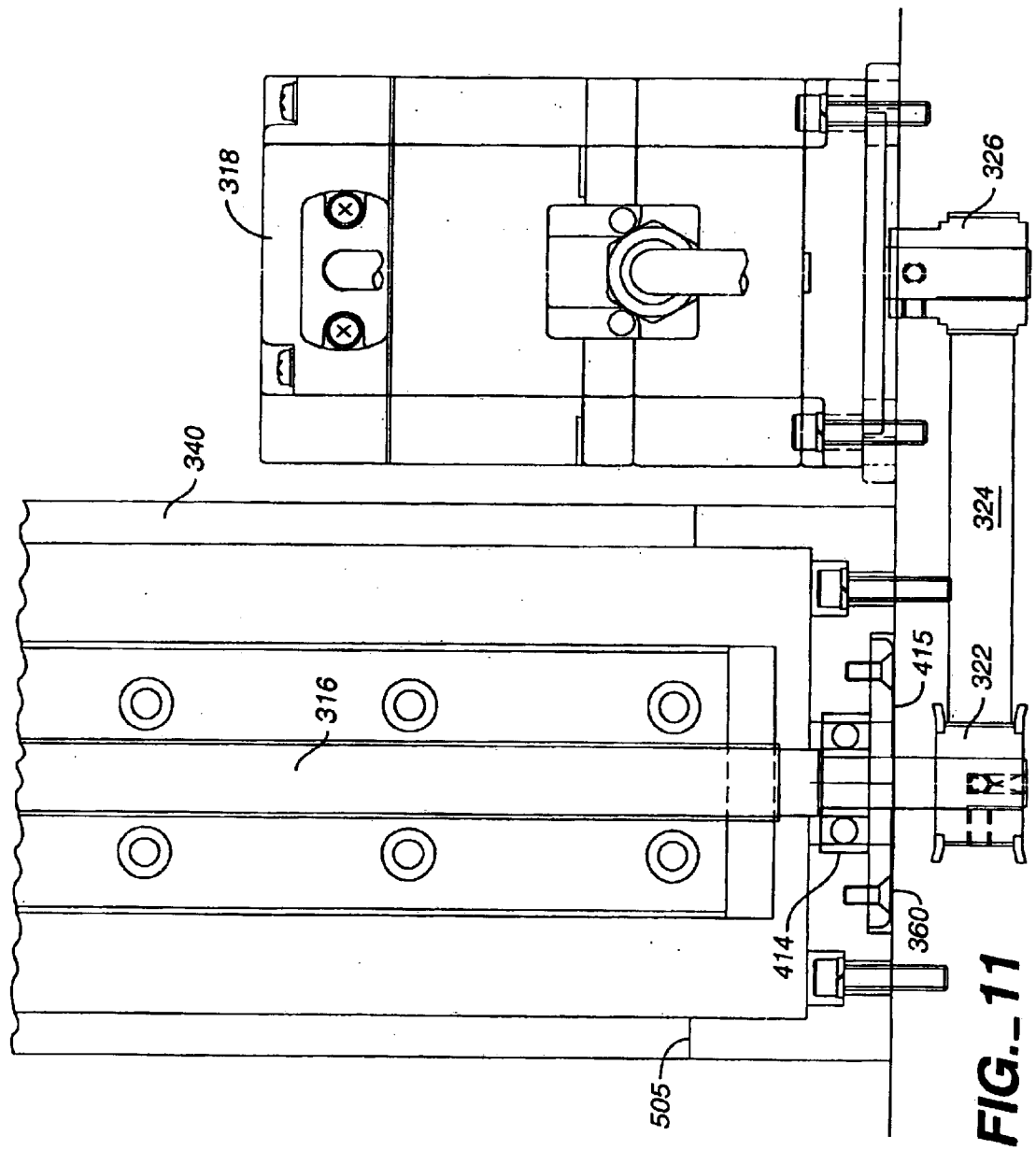
FIG._11

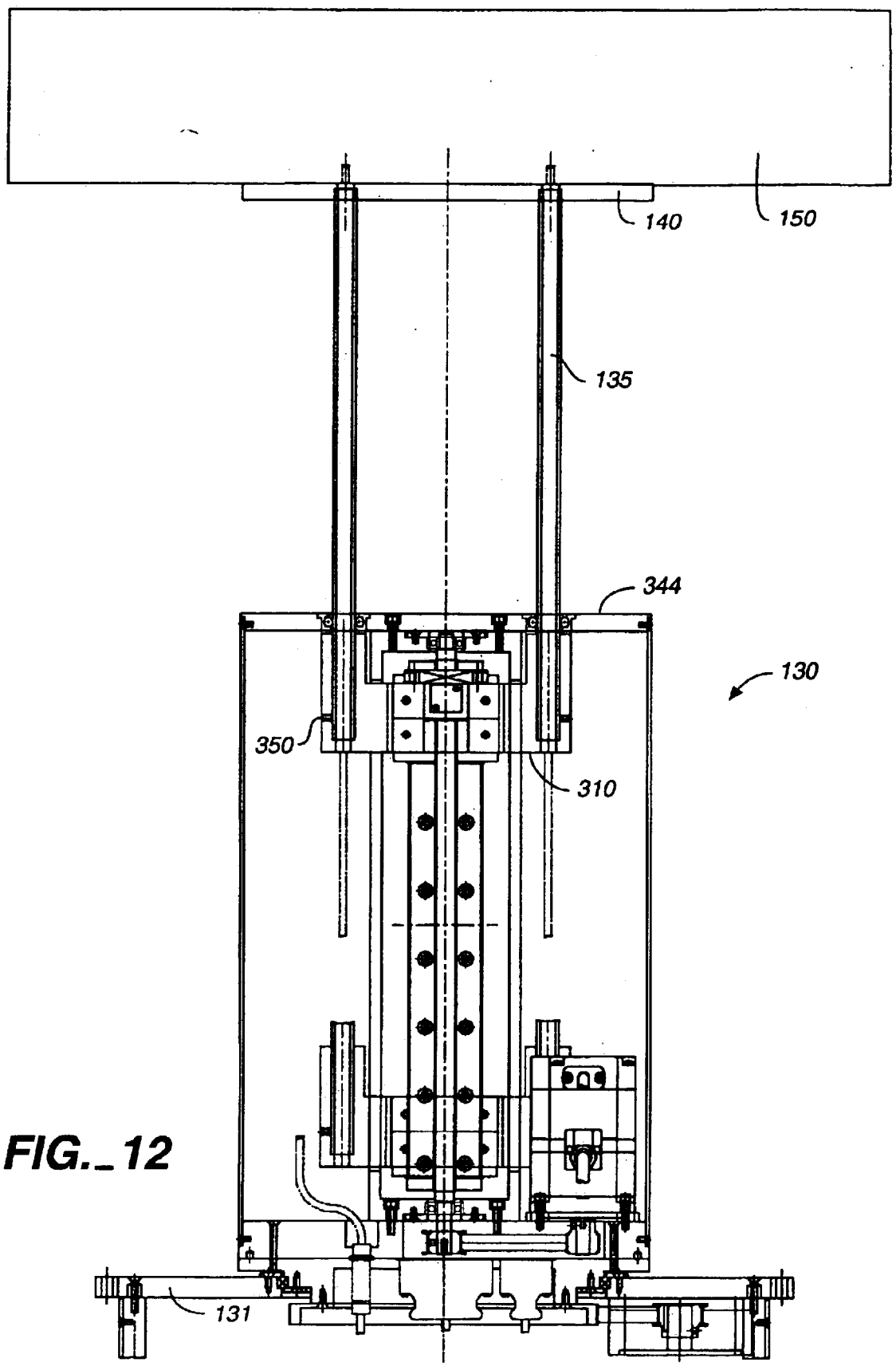
FIG._12

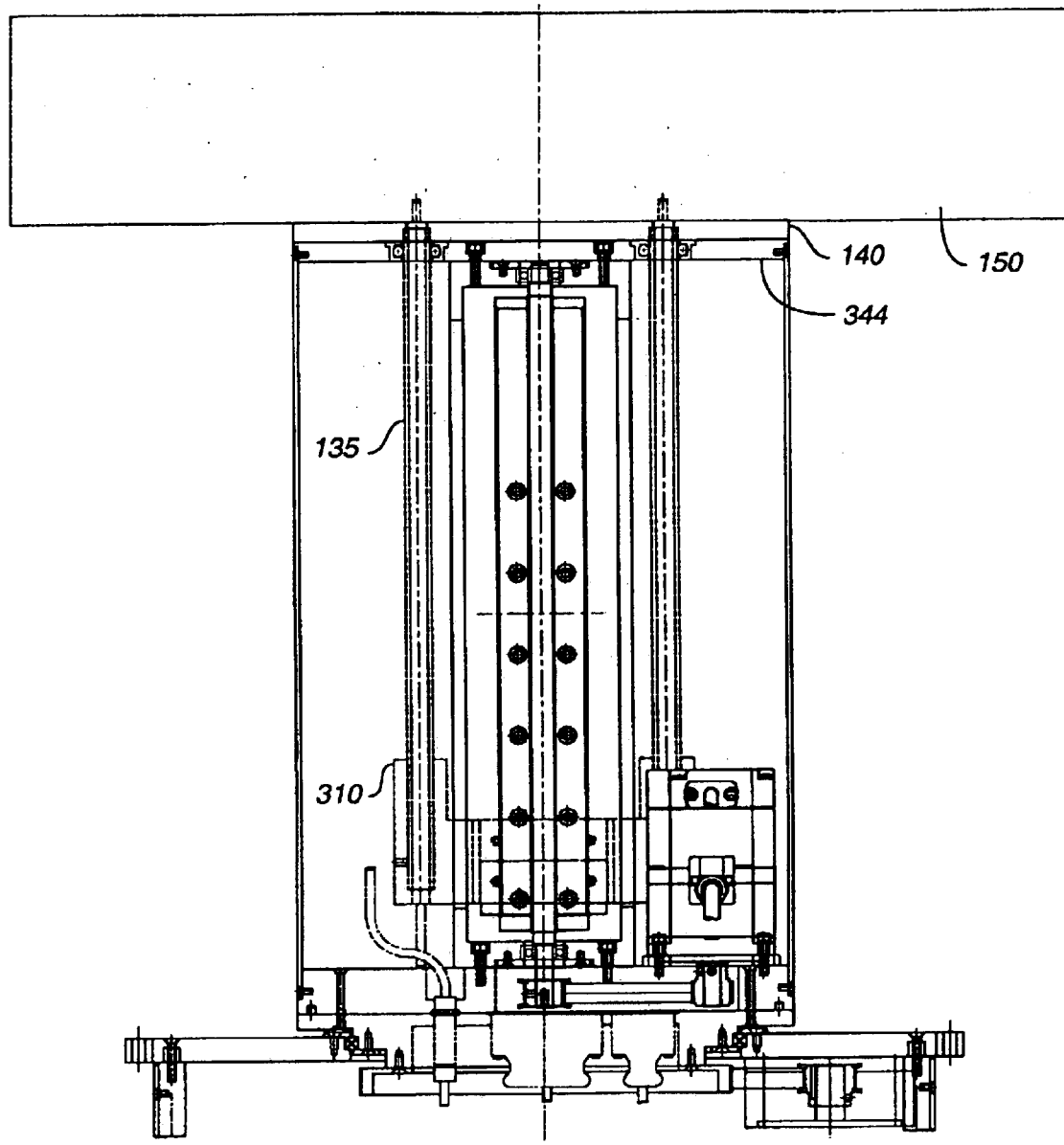
FIG._13

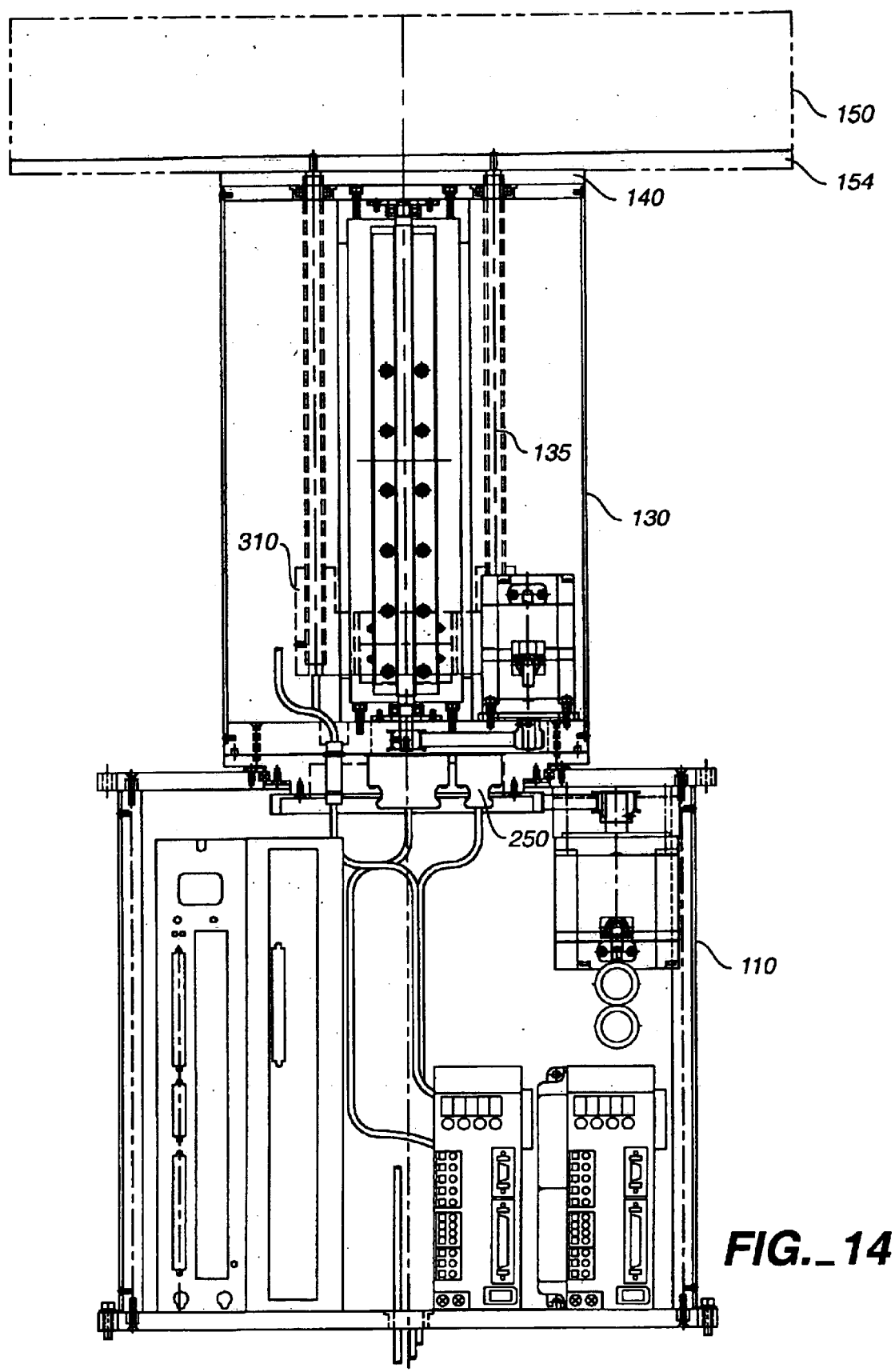
FIG._14

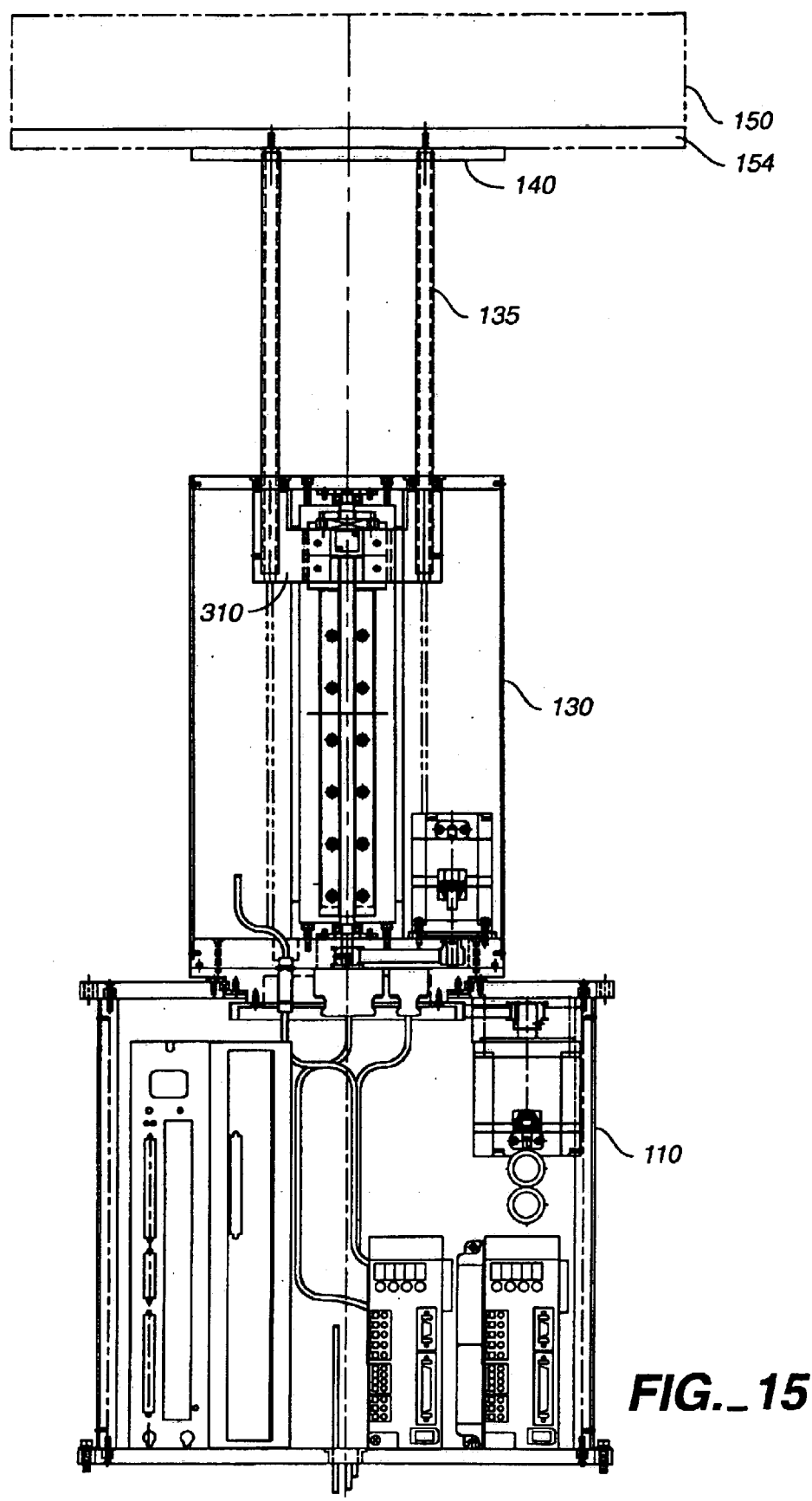
FIG._15

MODULAR HYBRID MULTI-AXIS ROBOT

TECHNICAL FIELD

The present invention relates to modular robotic systems, and more specifically to a modular robot having independent and interchangeable modules.

BACKGROUND ART

Programmable robotic apparatuses are widely used to carry out a variety of tasks such as picking up, transporting and placing objects in a programmed manner. Robotic apparatuses help to reduce the amount of manual labor required to perform simple, repetitive tasks. Robotic apparatuses are widely commercially available in a variety of different configurations. The most widely used configurations are the cartesian and the scara (selective compliance assembly robot arm) configurations.

Cartesian robots have three specified directions, X, Y, and Z coordinate directions at right angles to each other. The primary advantage of cartesian robots is that these robots are capable of moving in multiple linear directions. Additionally, cartesian robots are ready to program and have a rigid structure since their axes are supported at both ends. The main disadvantage of cartesian robots is that they require a large volume of space in which to operate.

Scara robots are cylindrical robots, having two parallel rotary joints and providing compliance in one selected plane. Scara robots are generally faster than cartesian robots, however they are usually less rigid and are limited by payload. All of the joints are at the end of the arm which results in more unsupported mass and a high cantilever moment, which leads to more vibration and a loss of repeatability. What is needed is a robotic apparatus that combines the beneficial features of each of the cartesian and scara types of robots, without the limitations noted above.

Additionally, it is often desirable to be able to customize the construction of a robotic apparatus to carry out a specific task that is desired. In the prior art, often times it is necessary for one to adjust the parameters of the task to fit the specifications of a commercially available robotic apparatus, rather than being able to customize the robot to fit the desired task. Additionally, it is desirable to be able to reconfigure a robotic apparatus to allow it to perform a number of different tasks. In order to increase the versatility of robot systems, several robotic systems are known that are constructed in a modular manner. Some robotic apparatuses of the prior art are characterized by a modular design, which allows greater ease in manufacturing and installation. Examples of these types of modular robotic apparatuses include U.S. Pat. No. 5,100,286 which discloses a modular robotic apparatus that is cartesian with a rotating tooling end-effector; U.S. Pat. No. 4,766,775 which discloses a modular cylindrical robotic articulate manipulator with gripper jaw tooling; U.S. Pat. No. 4,089,427 which discloses a robotic configuration of successive modules interconnected by a connecting tube and secured by standard fastening members and which operates in cartesian or spherical coordinate systems with a point-to-point trajectory; and U.S. Pat. No. 5,523,662, which discloses an expandable configuration of successive blocks robot system with a real time controller/computer architecture.

The above prior art robotic systems support manufacturing modularity, but do not support individual module interchangeability between each axis, since the modules are fully dependent on each other and support a defined configuration and specific assembly sequence. What is needed is a modular robotic apparatus that has detachable and independent modules to provide a flexible and custom solution for different applications.

It is the object of the present invention to provide a modular robotic manipulator having individual modules that are detachable and independent in order to support interchangeability between each axis and also to provide custom design flexability.

It is a further object of the invention to provide a modular robotic manipulator that can work in both cartesian and spherical coordinate systems and can operate with a combination of rotational and translational axes of movement in a hybrid coordinate system.

SUMMARY OF THE INVENTION

The above objects have been achieved by a modular multi-axis robot that can be configured to operate with two, three, four, five or six axes of movement and in various combinations of rotational and translational motion. The modules that make up the robot are fully detachable, interchangeable and are functionally independent with respect to each adjacent module. This allows the robotic apparatus to provide a flexible solution for many different applications.

In one basic embodiment of the invention, the robot can be configured in a three axis RTT alignment including a base module having a rotational degree of freedom, an upright stand module having Z-axis degree of freedom and being mounted on the base module, a transverse gantry module mounted on the upright stand module and having a translational degree of freedom and an end effector module mounted on the gantry module for carrying out whatever manipulating function that is required of the robot. Each of the modules are electrically, mechanically and pneumatically connected to an adjacent module and this is easily facilitated by way of a quick connector coupling plate that is included on each module.

The basic embodiment, described above, can be easily expanded into a four axis RTTR (rotational-translational-translational-rotational), a five axis TRTTR, or a six axis TRTTTR robot, or can be contracted into a two-axis RT robot system depending on the desired application. Thus, the hybrid modular robotic apparatus provides a flexible solution for many different industries, such as for transferring and handling semiconductor wafers, mask and reticules, memory disks, flat panel displays, fiber optics, and other high tech components, and for operating in clean room and/or atmospheric environments.

BRIEF DESCRIPTION OF THE DRAWINGS

FIG. 10 is a side perspective view of the backbone support structure and vertical carrier of the upright stand module.

FIG. 11 is a side view of the bottom portion of backbone structure support of the upright stand module.

FIG. 12 is a side view (without enclosure) of the upright stand module with the lifter arms raised to the top vertical position.

FIG. 13 is a side view (without enclosure) of the upright stand module of FIG. 12 with the lifter arms retracted to the lowest vertical position.

FIG. 14 is a side view (without enclosure) of the three axis configuration of the robot of FIG. 1 with the lifter arms of the upright stand module retracted to the lowest vertical position.

FIG. 15 is a side view (without enclosure) of the three axis configuration of the robot of FIG. 1 with the lifter arms of the upright stand module raised to the top vertical position.

BEST MODE FOR CARRYING OUT THE INVENTION

Figure 1:
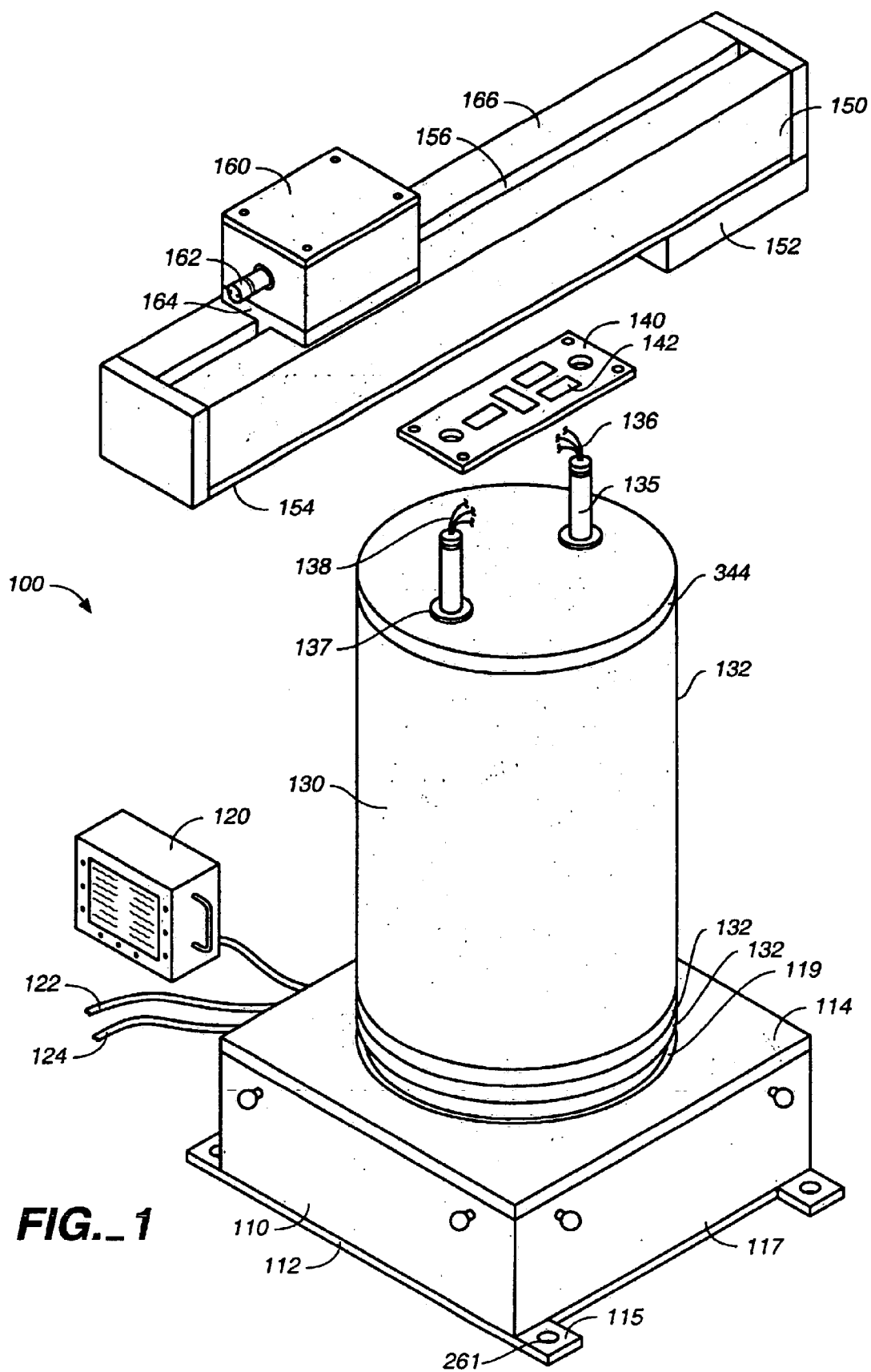
FIG. 1 is a partially exploded, perspective view of a first embodiment of the modular multi-axis robot of the present invention.

With reference to FIG. 1, the modular multi-axis robot 100 of the present invention includes a base module 110, an upright stand module 130 and a transverse gantry module 150. An end effector box 160 is mounted on top of the transverse gantry module 150.

The base module 110 provides the robot with a rotational axis of motion. The base module includes a bottom mounting plate 112 and a top mounting plate 114 which are attached by three or four columns and provide a solid and rigid support for the overall robot system 100. A universal mounting flange 115 is added to the bottom mounting plate 112 in order to provide for installation on a floor, wall, or ceiling. A mounting flange may also be located on the top plate 114 if desired. The mounting flange 115 includes adjustable slots and through holes 261 to assure a kinematic support alignment to the mounting surface. The base module 110 houses various motion controller and electronic system devices such as limit switches, sensors, input output terminals, amplifiers, pneumatic valves, fittings, solenoids, power supplies, programmable controllers, and servo motors and belt pulley drives for performing the rotational movement in a range of plus or minus 360 degrees. The base module 110 also includes skin covers 117, an access door, ventilation fan cooling systems, and a vacuum exhaust line. External connectors for power cables 122, ethernet cables 124, and a terminal for a human machine interface (HMI) 120 are also part of the base module 110. A balanced rotational spindle plate 118 is mounted on a bearing housing 119 on the top plate 114 surface of the base module. The rotational spindle plate supports and move the upper modules attached above the base module. The rotational spindle plate 118 is connected to a coupling plate 131 of the above attached module by located pins, fasteners, alignment screws, and edge profile quick disconnect metallic ring clamping belt. The coupling plate 131 connections also include quick connectors for connecting electrical and pneumatic components to the wiring and tubing of any upper modules.

The upright stand module 130 has a U-shaped backbone structure which supports a linear vertical rail and provides strength to the vertical axis mechanisms. A ball or lead screw nut is attached to a housing that is connected to the vertical linear rail carrier. The axis of movement is parallel and very close to the linear guide bearing rail. This helps to maintain the mass of the center of load in better balance in the vertical direction and also allows for lifting a heavier load. A ball screw shaft is driven by direct drive, servo motor and belt pulley mechanisms. The upright stand module 130 includes a pair of lifter arms 135 that passes through a top support plate 344, and attaches to the vertical housing 310 to form a U-shaped configuration for holding and moving up and down the transverse gantry module 150. The lifter arms 135 are two stiff hollow tubes or bars that are engaged to a transitional plate 140 where the transverse gantry module 150 is connected. Various electrical wiring 136 to connectors and pneumatic tubing 138 are routed through the lifter arms 135 and are connected to the transverse gantry module 150. The lifter arms 135 can be of varying diameters depending on the amount of payload required to be moved. For example, for larger pay load capacity, the lifter arms would have a greater diameter to allow larger size wiring to pass through. This allows the robot to be adapted for use with different size payloads.

The motor and transmission components are mounted modularly with adjustable brackets for self-alignment and interchangeable capabilities. The pneumatic tubing is routed and clamped inside each module using cut clamps that reproduce a circular geometry and avoid kinking of the tubing. A top support plate 344 and a bottom support plate are attached with the backbone column support. A circular enclosure 132 is used to enclose and protect the upright stand module 130. The bottom coupling plate 131 connects the upright stand module 130 to the base module 110 and balances the rotational plate 118.

A horizontal, or transverse gantry module is connected to the top of the upright stand module 130. As discussed, the upright stand module 130 provides translational motion in a vertical direction, while the transverse gantry module 150 provides translational motion in a horizontal direction. A connector plate 154 connects the transverse gantry module 150 to the transitional plate 140 that is engaged to the lifter arms 135 of the upright stand module 130. A slot in the bottom of the gantry module is provided for the connector plate 154 and transitional plate 140 to mate. The connector plate 154 may mate with the transitional plate 140 in the center of the gantry, to provide a center axis of rotation, or alternatively the connection can be made on an end or off center to provide flexibility in situations requiring less than full rotation or an increase in stroke in one direction only. A rectangular enclosure is used to enclose the drives, motors and components. The enclosure has a protector flexible strip and rolled band that moves together with the tooling carrier 160 in order to maintain cleanliness. A side wall mounting linear bearing rail in the transverse gantry module enclosure 166 that is used to provide better axial load distribution. The tooling carrier 164 is attached to the side wall mounting linear rail and is directly engaged to a belt or ball screw nut for transmitting the linear horizontal movement. The tooling carrier 164 supports the end effector box 160 which contains all of the control and power components for the end effector 162. The connector plate 154 contains a plurality of quick-connect connectors for connecting the pneumatics and electronics of the upright stand module 130 to the transverse gantry module 150. The access cover 152 provides access to the motor and drives of the gantry 150.

Figure 2:
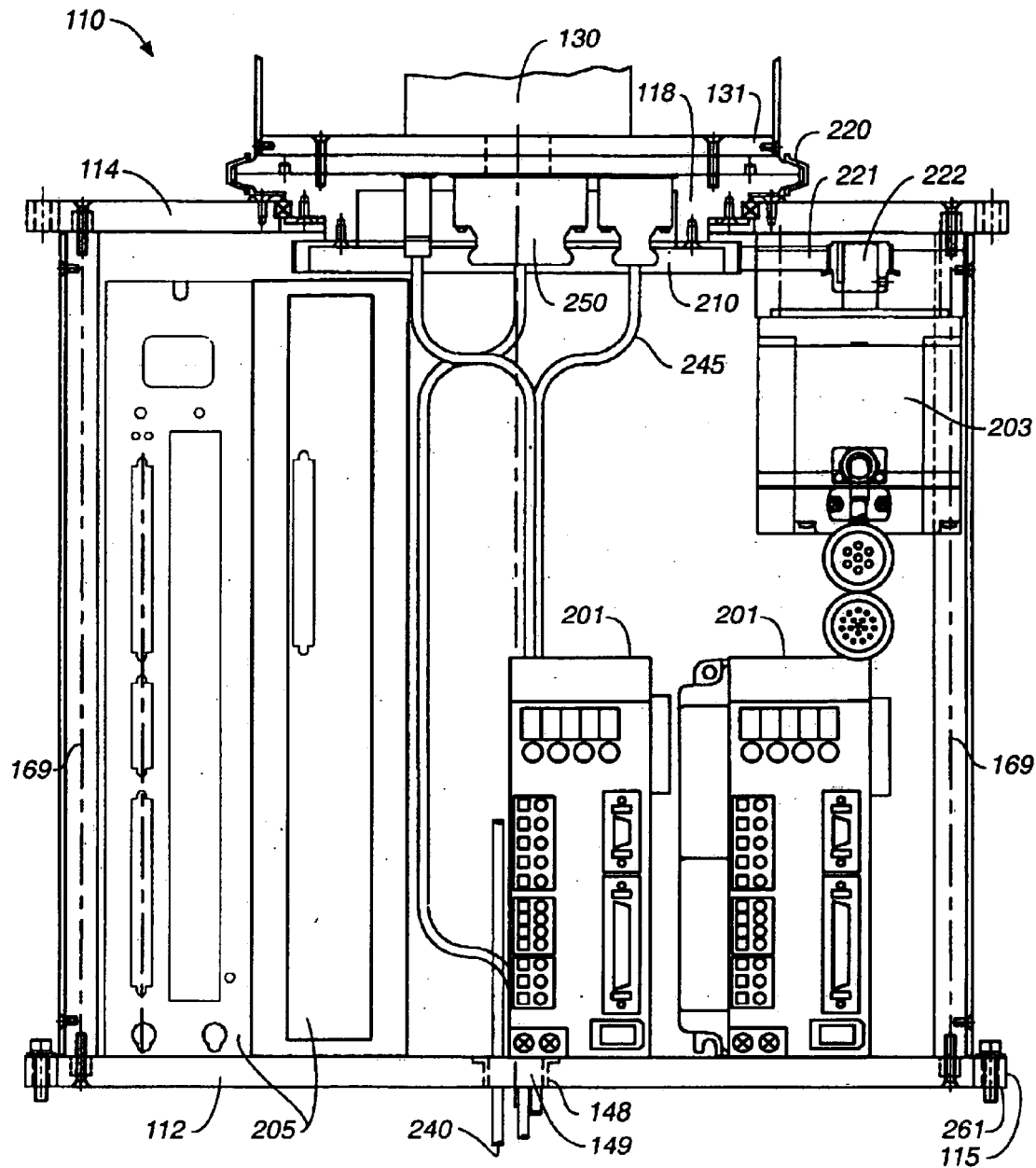
FIG. 2 is a side view of the base module (without enclosure) of the robot of FIG. 1.

With reference to FIG. 2, the base module 110 includes motor controllers 205 and motor amplifiers 201, which are mounted on the base plate 112. The base plate 112 has a plurality of mounting holes 261 in which mounting screws can be used to mount the overall robot apparatus. An opening 148 in the bottom of the base plate 112 facilitates the various wiring 240 from external power sources. This external wiring 240 includes the tubing and wiring for the various pneumatic and electrical systems used within the robot. A bushing 149 protects the wiring 240 as it passes through the base plate 112. The various cables are routed internally through the center of the base module and the internal wiring 245 connects to coupling plate 131 by way of a plurality of connectors 250. The base module 110 also includes a rotational motor 203, mounted to the top plate 114, which provides the power for the rotation of the base module. A driver pulley 222 is connected between the rotational motor 203 and a belt 221. The belt 221 is connected to a rotational pulley 210 which is connected to the rotational plate 118. A plurality of vertical frame members 169 on the outer edges of the base module 110, provide the base module with strength and rigidity. The top plate 114 and base plate 112 are mounted to the vertical frame members 169 by bolts or screws to provide the framework for the base module 110.

Figure 3:
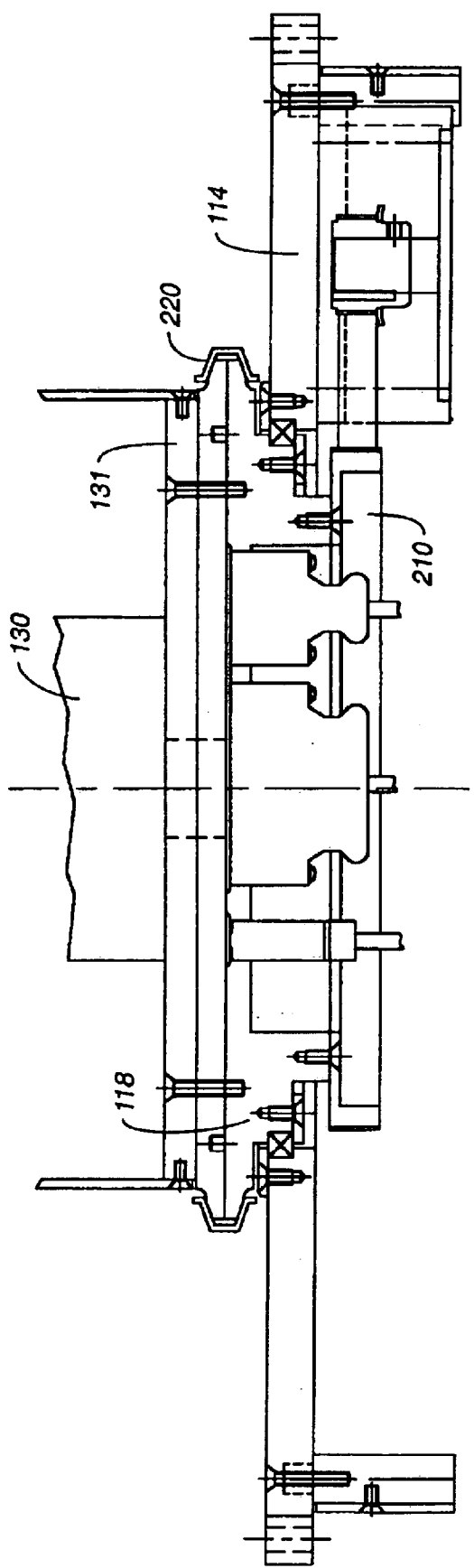
FIG. 3 is a side view showing the details of the balanced coupling plate, with a quick release v-clamp configuration, used to connect the base module and the upright stand module.

With reference to FIG. 3, the coupling plate assembly includes the rotational plate 118, and the coupling plate 131 on which the upright stand module 130 is mounted. The coupling plate 131 and rotational plate 118 are connected together by screws and dowel pins, and the assembly is also connected together by a quick release v-clamp latch 220. The rotational plate 118 is connected to the rotational pulley 210 by screws.

Figure 4:
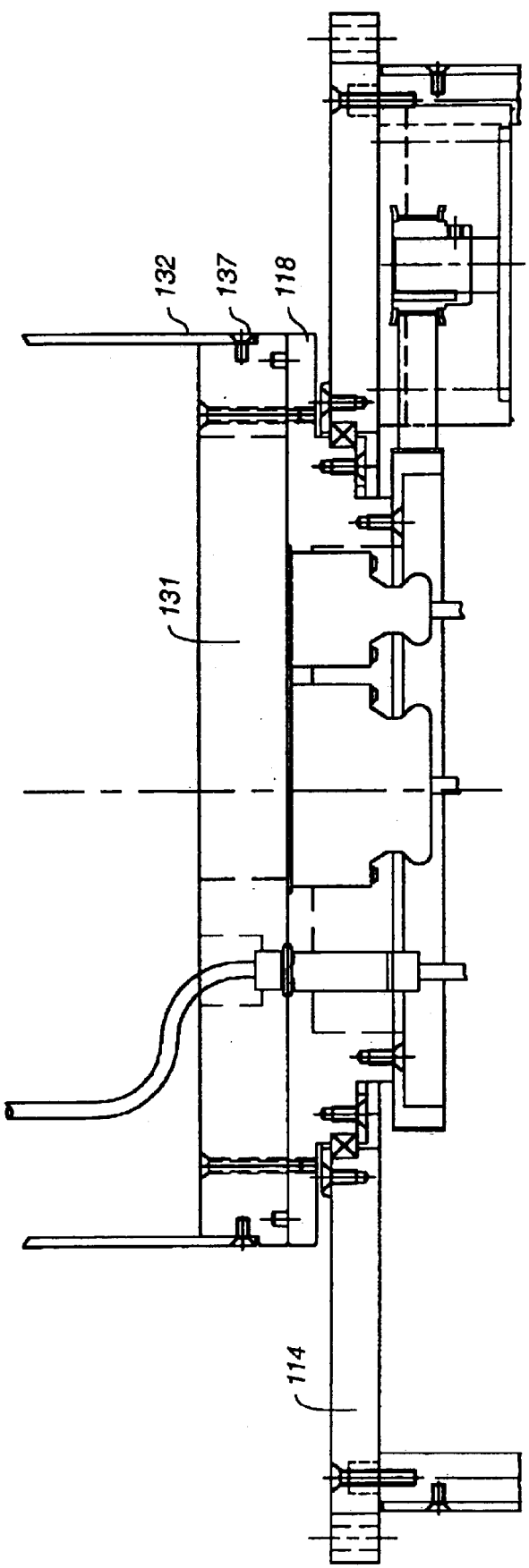
FIG. 4 is a side view showing an alternate version of the coupling plate connecting the base module and the upright stand module.
Figure 5:
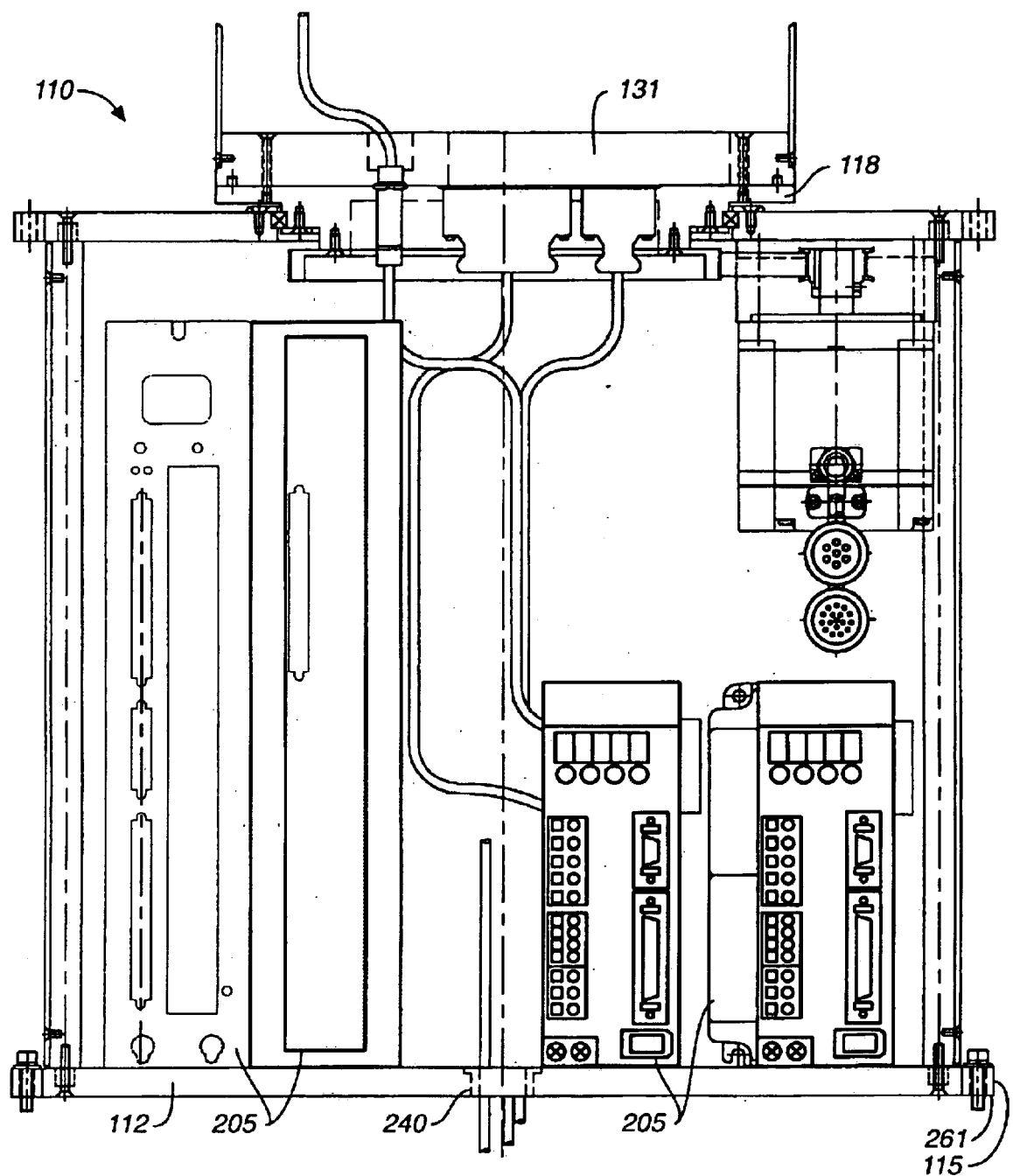
FIG. 5 is a side view of the base module showing the version of the coupling plate of FIG. 4.

FIG. 4 shows an alternate version of the coupling plate 131 in which the coupling plate 131 is connected to the rotational plate 118 only by screws and dowel pins, rather than by the v-clamp and latch. The enclosure 132 of the upright stand module is connected to the coupling plate by screws 137. FIG. 5 shows the overall base module 110 having the version of the coupling plate 131 described in FIG. 4.

Figure 6:
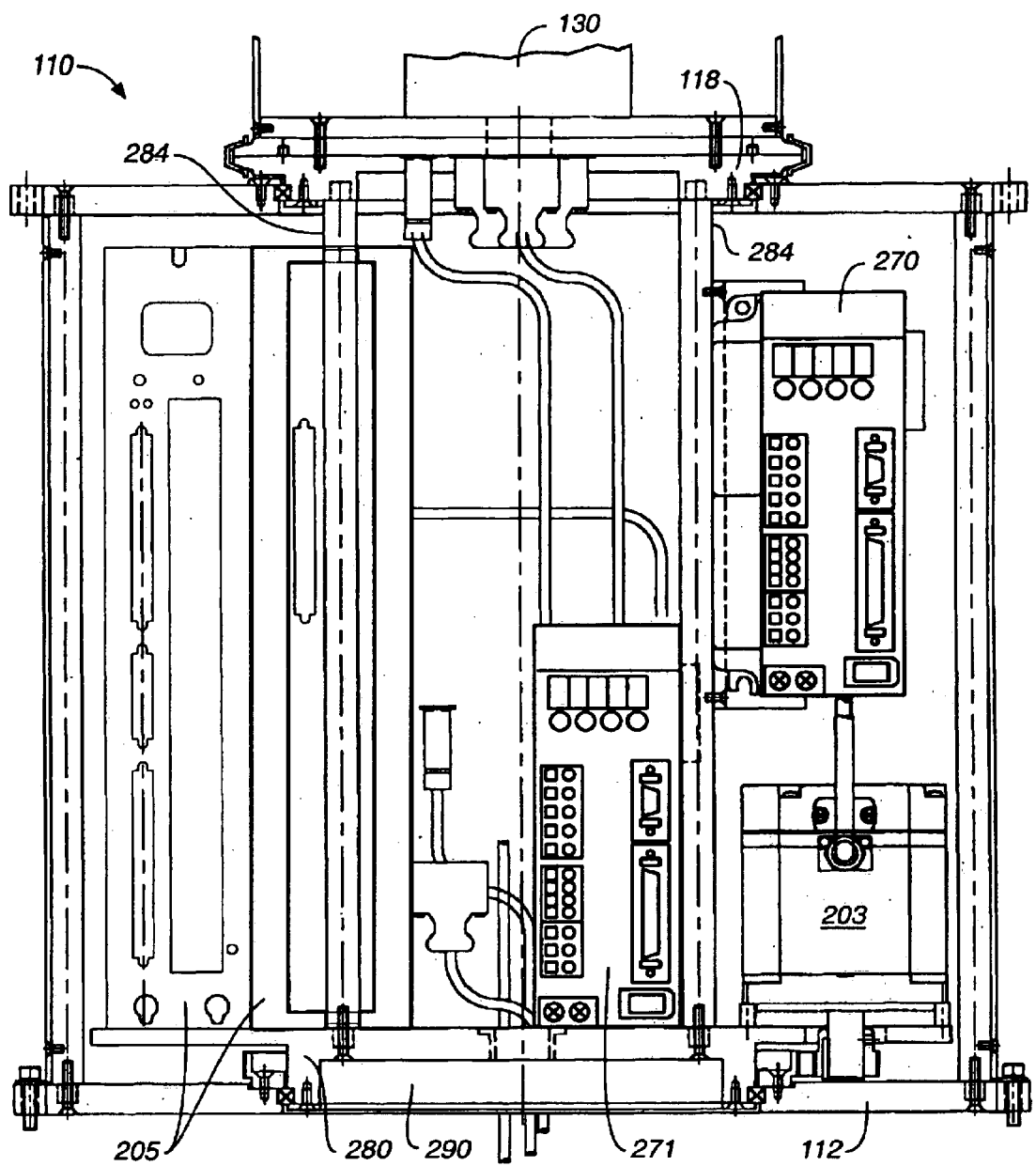
FIG. 6 is a side view of an alternate embodiment of the base module of the robot of FIG. 1.

With reference to FIG. 6, an alternate embodiment of the base module is shown. The embodiment of FIG. 6 is similar to that shown in FIG. 2, except that a base spindle plate 280 is used to perform the rotation such that the base module provides unlimited rotation. In the embodiment of FIG. 2, the base module rotates plus or minus 360°, but because of the cabling in the center of the base module, the base module does not have unlimited rotation. Through the use of the base spindle plate 280, the base module can have unlimited rotation. The other components in the base module of FIG. 6 are similar to that of the-standard version described with reference to FIG. 2 except that the motor controllers 205, rotational motor 203 and some of the motor amplifiers 271 are mounted on the base spindle plate 280. The other motor amplifier 270 is mounted above the rotational motor 203, on the transmission bar 284. The transmission bar 284 consists of three or four vertical members that connect the spindle plate 280 with the rotational plate 118. As the spindle plate 280 rotates, the transmission bar members 284 transmits the rotation to the rotational plate 118.

Figure 7:
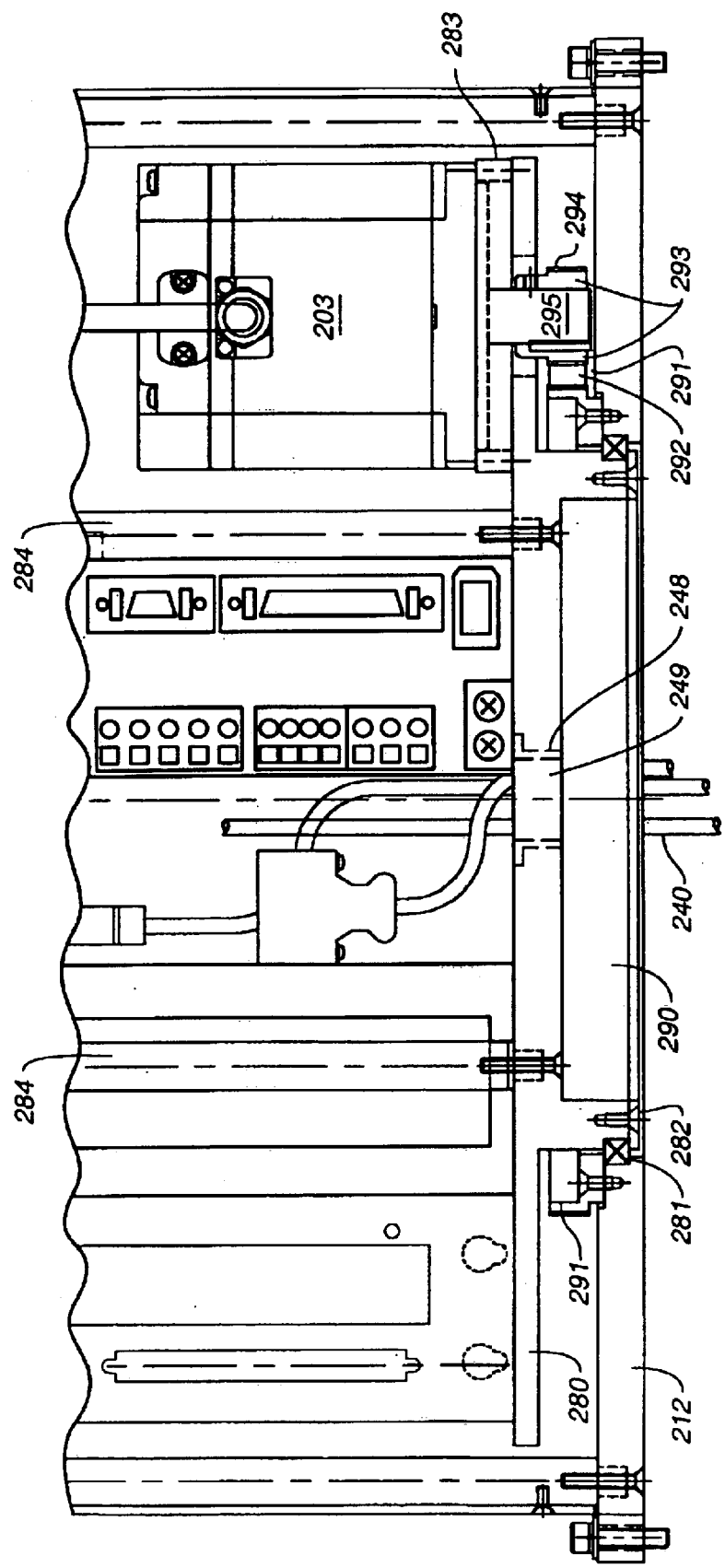
FIG. 7 is a side view of the bottom portion of the base module of FIG. 6.

Referring to FIG. 7, the base spindle plate assembly of the base module of FIG. 6 is shown. The external wiring 240 is routed through an opening 249 in the base spindle plate 280. A bushing 248 surrounds the opening 249 to protect the external wiring 240 from friction during the rotation of the base spindle plate 280. An opening/space 290 under the base spindle plate 280 is provided to allow for rotation and to allow space for the external wiring 240. The base spindle plate 280 is mounted to the base plate 212 by a base bearing 281 and a bearing clamp 282. A motor mounting clamp 283 is used to mount the rotational motor on the spindle plate 280. The rotational motor 203 rotates with the base spindle plate 280 by a standard driver pulley system. A motor pulley 293 is attached to the motor shaft 295 and a driven pulley 291 is fixed attached to the base plate 212. The teeth 294 of the motor pulley 293 make contact with the timing belt 292 between the motor pulley 293 and the driver pulley 291 to provide the rotation. The wiring being supplied through the opening 249 in the base plate does not impede the rotation of the base spindle plate 280. In this way, the base spindle plate version of the base module has unlimited rotation.

Figure 8:
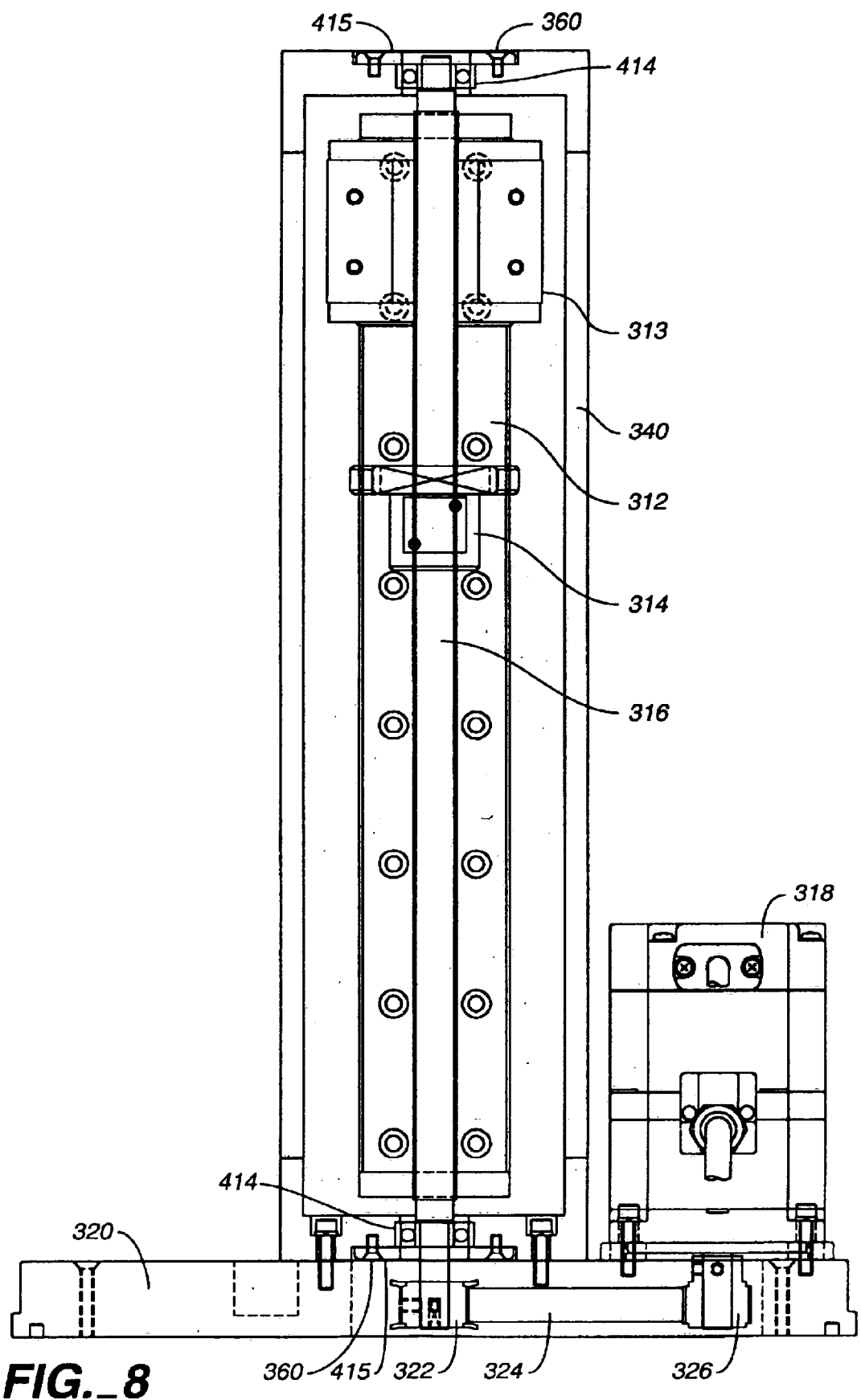
FIG. 8 is a side view of the internal mechanisms of the upright stand module.
Figure 9:
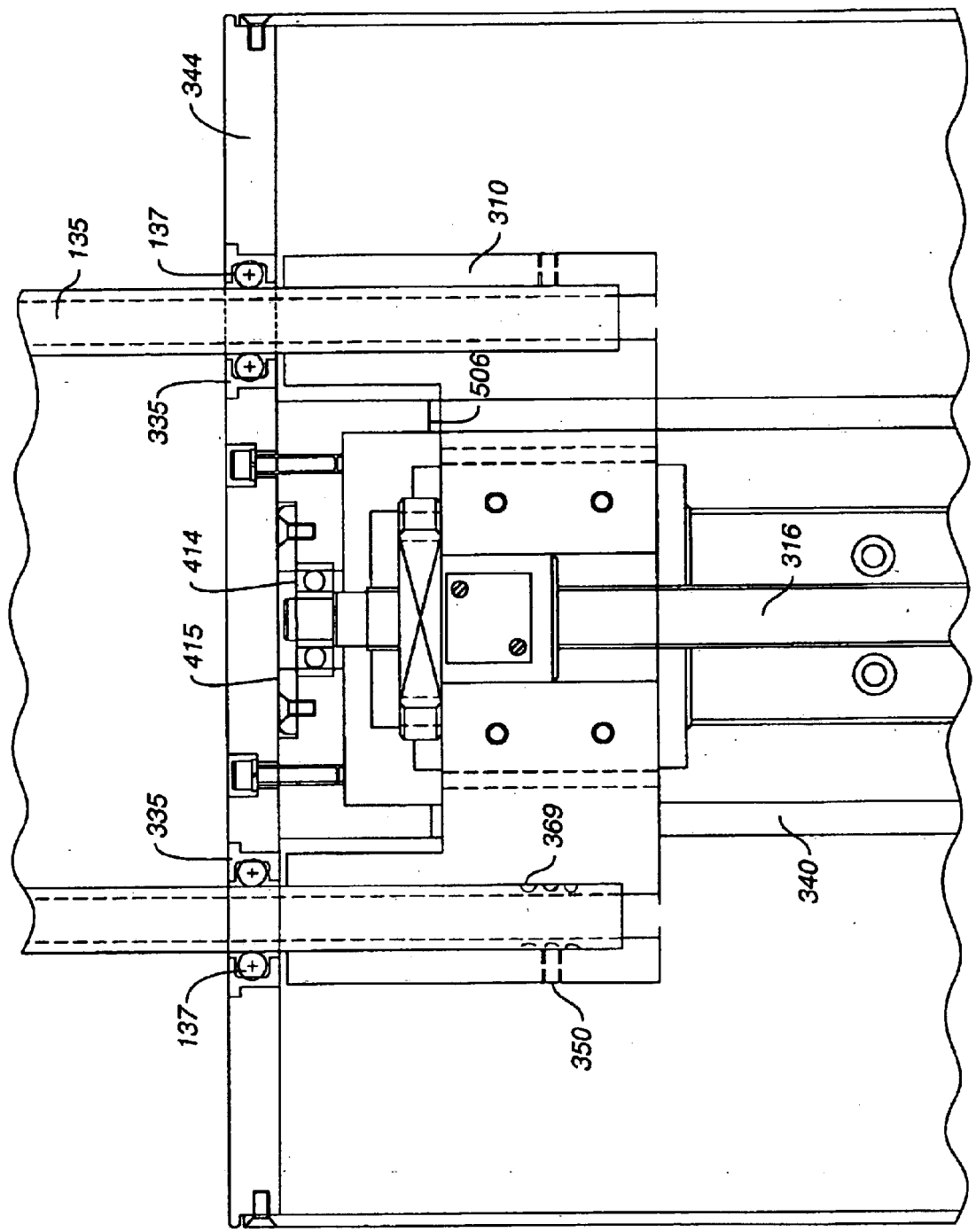
FIG. 9 is a side view of the top of the backbone support structure, vertical carrier and lifter arms of the upright stand module.

With reference to FIG. 8, the upright stand module 130 has a u-shaped backbone structure 340 which supports a linear rail 312 and provides strength to the vertical axis mechanisms. The linear rail 312 supports a ball screw nut 314 and ball screw shaft 316 which provide motion to a linear carrier 313, that is connected to the ball screw nut 314. With reference to FIG. 9, the vertical housing carrier 310 is attached to the linear rail bearing carrier 313 and to the ball screw nut 314. Referring also to FIG. 10, it can be seen that the vertical housing carrier 310 fits into the backbone support structure 340 by having a pair of ribs 405 which fit into the side of the linear carrier 313 and rail 312 of the vertical backbone structure 340. The vertical housing carrier 310 has a pair of holes 418, 419 in which the lifter arms 135 pass through and another hole 412 in which the ball screw shaft 316 passes through. The ball screw shaft 316 also passes through holes 411 and 410 of the backbone structure 340. Both ends of the ball screw shaft are mounted into rolling bearings 414 and are mounted into the holes 410 and 411, and secured by the top and bottom bearing clamps 415 (see FIG. 8). Thus, the vertical carrier 310 moves up and down through the backbone structure 340 as the ball screw shaft assembly moves up and down. Referring to FIG. 9, a pair of set screws 350 on either side of the carrier 310 set the position of the lifter arms 135. As shown in FIG. 9, the set screws 350 make contact with the notches 369 on the outer edge of the lifter arm tubes 135 of the backbone structure 340 to limit the upward and downward travel of the vertical housing carrier 310, and thus adjust and calibrate the stroke of the lifter arms 135. The ability to adjust and calibrate the stroke of the lifter arms enhances the flexibility and custom design features of the robot module. The lifter arm tubes 135 can have a range of variable diameters and can be made of various materials (ex. Al, SST, etc.). The lifter arm tubes 135 are secured through the top plate 344 of the vertical module, and the lifter arms 135 move inside the bushing 335 and o-ring seal 137. The top plate 344 is attached to the backbone structure 340 by screws. The backbone upper edge 506 and lower edge 505 limit the vertical housing carrier 310 traveling stroke in the up and down motion. Optionally, limit switches or similar types of limiting sensor components can be installed on the edges 506, 505 of the backbone structure to limit the vertical motion. These types of limit switches may also be included in the base module 110 and the transverse gantry module 150 to provide limitations on the rotational and horizontal motions, respectively.

With reference to FIG. 11, the belt pulley and motor mechanisms for driving the ball screw shaft 316 are shown. The ball screw shaft 316 passes through the backbone structure 340, and a pair of bearings 414 and bearing clamps 415 secures it to the backbone structure with screws 360. The ball screw shaft 316 is also connected to a driver pulley 322, a timing belt 324 and a motor pulley 326. These components are connected to a vertical module motor 318 to provide the torque to the ball screw shaft 316 for moving the vertical housing carrier 310 to lift and retract the lifter arms.

With reference to FIG. 12, the upright stand module 130 is shown in the position where the lifter arms 135 are raised to the maximum vertical position. The connector plate 140 between the lifter arms 135 and the transverse gantry module 150 is shown. The set screws 350 on either side of the vertical housing carrier 310 serve to stop the motion of the lifter arms when the lifter arms have reached their top vertical position, as explained above. With reference to FIG. 13, the upright stand module 130 is shown with the lifter arms 135 retracted to the lowest vertical position. In that case, the vertical housing carrier 310 lower edge stop above the lower edge 505 of the backbone support structure 340, for homing the lifter arms 135 in the fully retracted position.

FIG. 14 shows the three axes embodiment of robot apparatus, including the base module 110, the upright stand module 130 and the gantry module 150, with the lifter arms 135 and vertical housing carrier retracted into the upright stand module 130. FIG. 15 shows the robot apparatus of FIG. 14 with the vertical housing carrier at its top position and the lifter arms 135 extended out of the upright stand module 130 to its maximum extended position.

A two axis version of the robot apparatus can be made by omitting the upright stand module 130 and connecting the gantry 150 directly to the base module 110. In that case, with reference to FIG. 14, the connector 250 from the base module would connect directly into the connector plate 154 of the gantry 150. In this way, it can be seen that the modules are independent and can be detached and recombined to form a custom and modular robot apparatus that meets a variety of design requirements.

The multi-axis robot can be used in a regular atmospheric environment, but can also be adapted for clean room environments. To adapt the robot for clean room environments, several features are added to the basic modules in order to eliminate dust and contaminants. For example, referring back to FIG. 1, on the upright stand module 130, two O-ring seals 137, such as the "Kalrez" clean room types are mounted inside the o-ring bushing 335 (see FIG. 9), and on top of the support plate 344 and around the two lifter tube arms 135. An inner negative pressure line can be implemented in order to remove particles from pressuring inside each module of the robot.

In the embodiment of the present invention shown in FIG. 1, there are three axes of movement, rotational movement due to the base module, translational vertical movement due to the upright stand module 130, and translational horizontal movement due to the transverse gantry module 150. Additionally, the robot can be adapted for additional axes of movement. For example, the end effector box 160 can be adapted to provide rotational motion, thus providing a fourth axis of movement. For a fifth axis of movement, the base module 110 can also be adapted to move in a translational, horizontal fashion. Finally, the end effector box 160 can be adapted to also move in a translational direction to provide a sixth axis of motion. Also, as explained above, the version of the robot having just the base module with a gantry will provide two axes of motion.

As can be seen, all of the modules are independent and interchangeable. The robot of the present invention is a universal solution and can be adapted for many applications, including custom applications in atmospheric and clean room applications.

What is claimed is:

1. A modular multi-axis robot comprising:
    a base module having a rotational degree of freedom;
    an upright stand module having a z-axis degree of freedom and being mounted on the base module;
    a transverse gantry module mounted on the upright stand module and having a translational degree of freedom;
    an end effector module mounted on the gantry module; and
    wherein each of the modules are electrically, mechanically and pneumatically connected to an adjacent module, and wherein each of the modules are independent and detachable from the adjacent module.

2. The robot of claim 1 further comprising:
    controller means for controlling motion of the modules; and
    power transfer means for providing power to the modules.

3. The robot of claim 1 further comprising a connector plate mounted between the upright stand module and the transverse gantry module, said connector plate including a plurality of connectors for electrically connecting the modules together.

4. The robot of claim 1 wherein the transverse gantry module has a channel for securing a movable carrier, said end effector module being mounted on the movable carrier.

5. The robot of claim 1 wherein the end effector module has a rotational degree of freedom.

6. The robot of claim 3 wherein the upright stand module includes a plurality of lifter arms, said lifter arms housing a plurality of cables.

7. The robot of claim 6 wherein the plurality of cables includes sensor wires, motor cables and pneumatic tubing.

8. The robot of claim 6 wherein the lifter arms can be adapted to have diameters of different sizes.

9. The robot of claim 1 wherein the base module additionally has a translational degree of freedom.

10. The robot of claim 1 wherein the upright stand module includes:
    a backbone structure connected to a linear vertical rail;
    a ball screw shaft and a ball screw nut coupled to the linear vertical rail; and
    a linear carrier connected to the ball screw nut.

11. The robot of claim 10 further comprising:
    a vertical housing carrier coupled to the linear carrier and to the ball screw nut, said vertical housing carrier having a first hole through which the ball screw shaft passes and a plurality of second holes; and
    a plurality of lifter arms, each of the lifter arms passing through one of said plurality of second holes of the vertical housing carrier.

12. The robot of claim 11 wherein a vertical motor rotates the ball screw shaft to move the ball screw nut vertically; and the vertical housing carrier moves vertically through the backbone structure with the ball screw nut movement.

13. The robot of claim 11 further comprising means for calibrating a position of the lifter arms.

14. The robot of claim 13 wherein said means for calibrating includes a plurality of notches in said lifter arms and a plurality of set screws contacting said notches at the position.

15. The robot of claim 1 wherein each of the modules is encased in an enclosure that is suitable for clean room applications.

16. The robot of claim 1 wherein the base module includes a universal mounting flange for installation of the robot.

17. The robot of claim 16 wherein the universal mounting flange is a top plate of the base module.

18. The robot of claim 16 wherein the universal mounting flange is a bottom plate of the base module.

19. The robot of claim 16 wherein the universal mounting flange has a plurality of mounting holes allowing the robot to be mounted on any one of a wall, a floor or a ceiling.

20. The robot of claim 1 wherein each of the base module, upright stand module and gantry module include means for limiting motion of the modules.

21. The robot of claim 1 wherein the base module includes a coupling plate assembly for connecting the base module to the upright stand module.

22. The robot of claim 21 wherein the coupling plate assembly includes a rotational plate coupled to a top plate of the base module, and a coupling plate connected to the vertical module and to the rotational module.

23. The robot of claim 22 wherein the rotational plate and the coupling plate are coupled by a plurality of quick release v-clamp latches.

24. The robot of claim 1 wherein the upright stand module includes a plurality of adjustable brackets for mounting of motor and transmission components.

25. The robot of claim 1 wherein the transverse gantry module includes a plurality of adjustable brackets for mounting of motor and transmission components.

26. The robot of claim 6 wherein the transverse gantry module includes a base connector plate which connects the transverse gantry module to the connector plate that is engaged with the lifter arms of the upright stand module.

27. The robot of claim 5 wherein the end effector box additionally has a translational degree of freedom, said translational degree of freedom of the end effector box being transverse to the translational degree of freedom of the transverse gantry module.

28. The robot of claim 1 wherein the base module includes a base plate and a top plate connected by a plurality of frame members.

29. The robot of claim 28 wherein the base module includes a rotational plate mounted on a bearing housing on the surface of the top plate.

30. The robot of claim 29 wherein the base module further comprises:
   a motor controller and motor amplifier connected to the base plate;
   a rotational motor having a shaft and being fixed attached to the top plate;
   a rotational pulley coupled to the rotational plate;
   a belt connected to the rotational pulley; and
   a driver motor pulley attached to the shaft of the rotational motor and connected to the belt.

31. The robot of claim 29 wherein the base module further comprises:
   a base spindle plate mounted to the base plate by a base bearing and a bearing clamp;
   a rotational motor mounted on the base spindle plate;
   a driver pulley fixed attached to the base plate;
   a motor pulley attached to a shaft of the rotational motor, said motor pulley having a plurality of teeth; and
   a timing belt connected between the driver pulley and the motor pulley.

32. The robot of claim 31 wherein the base spindle plate has an opening for routing of a plurality of wires and cables, said opening being surrounded by a bushing.

33. The robot of claim 31 wherein a space is provided under the base spindle plate to allow for rotation.

34. The robot of claim 31 further comprising a plurality of transmission bars connected between the rotational plate and the base spindle plate.

35. The robot of claim 31 wherein the base module has unlimited rotation.

36. The robot of claim 30 wherein the base module has rotation in the range of plus/minus 360 degree.

37. A modular multi-axis robot comprising:
   a base module having a rotational degree of freedom;
   a transverse gantry module mounted on the base module and having a translational degree of freedom;
   a connector plate mounted between the base module and the transverse gantry module, said connector plate including a plurality of connectors for electrically connecting the modules together;
   an end effector module mounted on the gantry module;
   controller means for controlling motion of the modules;
   power transfer means for providing power to the modules; and
   wherein each of the modules are electrically, mechanically and pneumatically connected to an adjacent module, and wherein each of the modules are independent and detachable from the adjacent module.

38. A modular multi-axis robot comprising:
   a base module having a rotational degree of freedom;
   an upright stand module having a z-axis degree of freedom and being mounted on the base module;
   a coupling plate assembly for connecting the base module to the upright stand module;
   a transverse gantry module mounted on the upright stand module and having a translational degree of freedom;
   a connector plate mounted between the upright stand module and the transverse gantry module, said connector plate including a plurality of connectors for electrically connecting the modules together;
   an end effector module mounted on the gantry module;
   controller means for controlling motion of the modules;
   power transfer means for providing power to the modules; and
   wherein each of the modules are electrically, mechanically and pneumatically connected to an adjacent module, and wherein each of the modules are independent and detachable from the adjacent module.

* * * * *